Sept. 4, 1951 A. DI FONZO 2,567,104
AUTOMOBILE LUGGAGE CARRIER AND TABLE
Filed Dec. 29, 1949 2 Sheets-Sheet 1
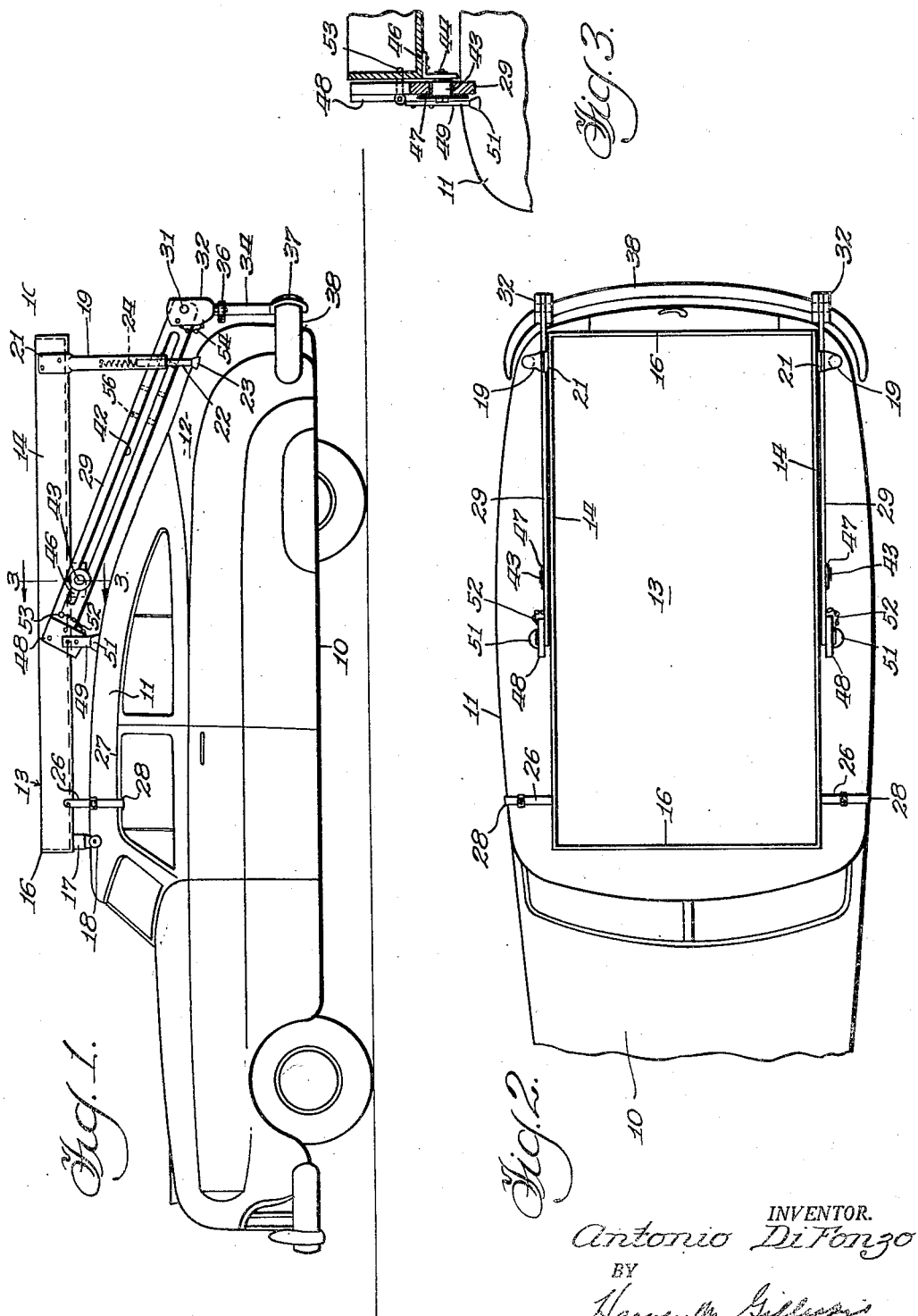
INVENTOR.
Antonio Di Fonzo
BY
Harvey M. Gillespie
Atty.

Sept. 4, 1951     A. DI FONZO     2,567,104
AUTOMOBILE LUGGAGE CARRIER AND TABLE Filed Dec. 29, 1949     2 Sheets-Sheet 2

INVENTOR.
Antonio Di Fonzo
BY
Harvey M. Gillespie
Atty.

Patented Sept. 4, 1951

2,567,104

UNITED STATES PATENT OFFICE 2,567,104

AUTOMOBILE LUGGAGE CARRIER
AND TABLE

Antonio Di Fonzo, Chicago, Ill.

Application December 29, 1949, Serial No. 135,760

5 Claims. (Cl. 224—42.01)

1

This invention relates generally to improvements in luggage carriers for automobiles and relates particularly to a luggage carrier normally supported in a position above the top or roof of an automobile and adapted to be lowered to provide a table.

Heretofore, it has been possible to support a luggage carrying rack or receptable on the top of a metal top automobile by means of vacuum cups gripping the metal surface to hold the luggage rack or receptacle securely. Such arrangements have been characterized by the necessity of loading the carrier while it remained in its position above the roof of the automobile, since no provisions were made for lowering such carriers to a lower and more convenient level for loading. Also, when the luggage consisted of unitary and relatively heavy articles considerable difficulty has been experienced, in lifting them into the carrier above the top of the automobile.

According to the present invention, the luggage carrier may be raised to a position above the top of the automobile or it may be lowered to the ground. In this connection use is made of the generally smooth contours of the top and rear deck portions of the modern-way automobile to provide a surface for a pair of rollers supporting the forward end of a luggage carrying receptacle and to provide a surface for a pair of vacuum cups mounted at the lower ends of standards supporting the rear end of the receptacle. Use is also made of a pair of swinging members for partly supporting the loaded receptacle and to provide an inclined trackway therefor in moving same to a position atop the vehicle or to a position to the rear of the vehicle for unloading or loading as the case might be. The swinging members are further characterized by vacuum cups mounted at the ends thereof to engage the top surface of the vehicle and thereby furnish points of support for the receptacle when it is in its raised position atop the automobile.

One of the principal objects of the invention is to provide an automobile luggage carrier adapted to be readily and conveniently moved into and out of its position atop an automobile and is so constructed as to require a minimum expenditure of effort by the user in moving the loaded carrier to position atop the vehicle or to lower it therefrom.

Other objects and important features of the invention will be apparent from the following description taken together with the drawings which illustrate a preferred embodiment of the

2 invention and what is now considered to be the best mode of applying the principles thereof.

While the invention is described in terms of what is now considered to be a preferred embodiment, its scope is not intended to be limited in terms of the embodiment, nor otherwise than by the claims appended.

In the drawings:

Fig. 1 is a side view of an automotive vehicle showing positioned on the top thereof the luggage carrier according to the present invention.

Fig. 2 is a plan view of the luggage carrier shown in Fig. 1.

Fig. 3 is a section taken along the line 3—3 of Fig. 1 showing details of a sliding connection of the luggage carrier with one of the swinging support arms for moving the luggage carrier to the loading position.

Figure 4:
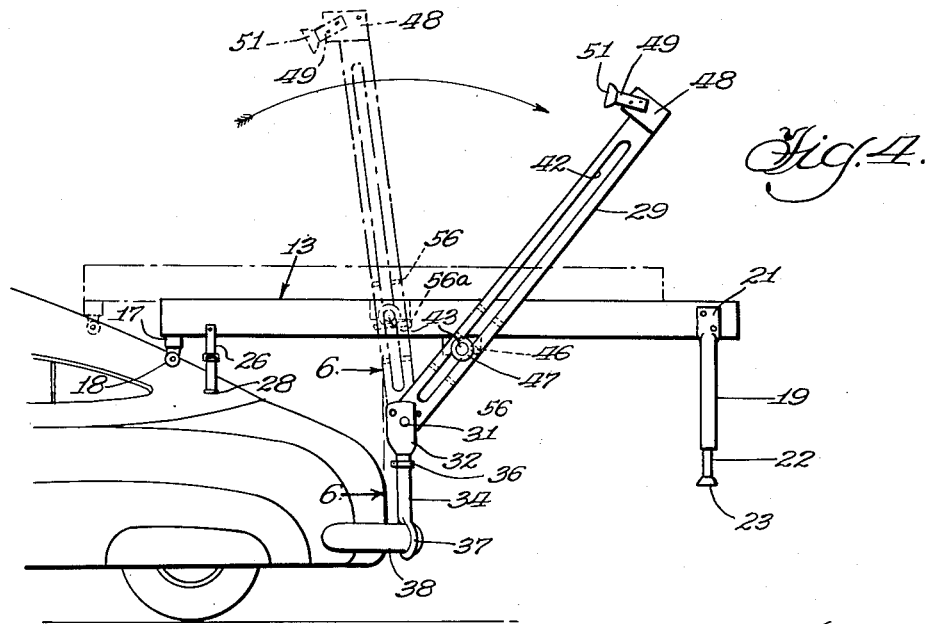
Fig. 4 is a detailed side view showing the relative position of the carrier and the swinging support arms in being moved to the unloading position.

Referring now particularly to Figs. 1 and 2 of the drawings, there is shown an automobile 10 of the all metal body construction characterized by a metal roof or top 11 which is shaped into alignment with a rear deck surface 12 with substantially unbroken lines and with smooth contours.

The top 11 provides a support for a luggage rack, platform or carrying receptacle 13 which in the form shown is a shallow box having sides 14 and ends 16. The forward end of the receptacle 13 is provided with spaced short legs 17 to which are secured rollers or wheels 18 made preferably of rubber and adapted to move the receptacle 13 easily over the top and rear deck surfaces 11 and 12 as will presently be described.

The rear end of the receptacle 13 is provided with a pair of tubular supports 19 secured at each side thereof. Each tubular support 19 is flattened as at 21 and riveted or bolted to the side 14 as shown, and is provided with a telescoping foot 22 having a vacuum gripping device 23 thereon to engage the rear deck portion 12. The telescoping foot impinges against a spring 24 within the tubular support, the spring 24 affording a certain amount of resiliency to absorb shock against the receptacle 13 as might be occasioned by the vehicle 10 operating over an uneven road surface.

The luggage receptacle 13 is additionally held in place atop the vehicle 10 by adjustable web strapping 26 connected at one end to the receptacle 13 in any convenient fashion and to the drain gutter 27 of the car 10 by means of a hook 28 bent around to engage the gutter 27 on its underside.

Figure 7:
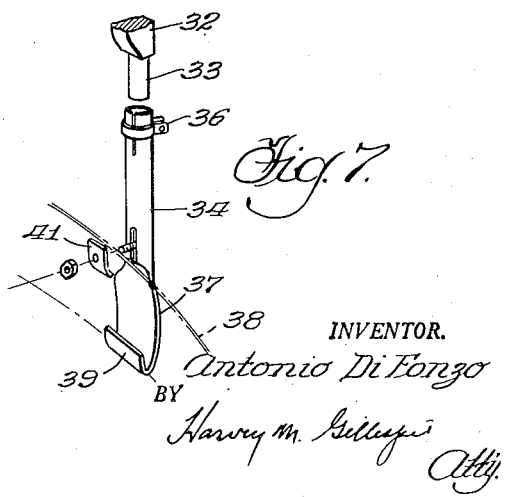
Fig. 7 is a perspective view showing the manner in which the standard shown in Fig. 6 is secured to the bumper of the automotive vehicle.

The luggage receptacle 13 is additionally supported in its position atop the vehicle 10 by a pair of support arms 29 which lie within the supports 19 and each of which are pivotally connected at 31 to a clevis 32 provided with a boss 33 and clamped in the upper end of a split upstanding tubular post bracket 34 by a clamping collar 36. There are two post brackets 34, one for each supporting arm. Each post 34 is flattened and curved at its lower end, as at 37, to conform to the contours of a rear bumper 38 of the vehicle 10. The curved lower end 37 is bent around the bumper 38 as at 39 to form a hook, and the post 34 is held to the bumper 38 by a clamping spring clip 41 and the nut and bolt shown in Fig. 7.

The support arms 29 are each provided with a slot 42 to receive a roller 43 which freely turns on a pin 44 supported on a short angle member 46 bolted to the underside of the receptacle 13. The pin and roller 43, 44 are held within the slot 42 by a washer 47 as shown particularly in Fig. 3.

The upper end of each support arm 29 is secured to a plate 48 having a leg 49 extending downward therefrom. Each leg 49 is provided with a vacuum gripping device 51 which grips the top surface 11 in a fashion like the vacuum gripping device 23.

The structure thus far described may be locked in the position atop the vehicle 10 by a chain and pin assembly 52 having a pin 53 passing through the arm 29 and the side 14 of the receptacle 13. Obviously, the holes in the side 14 and the arm 29 may be suitably spaced to accommodate different sizes and shapes of the vehicle 10.

The lower end of the arm 29 may likewise be locked in position with reference to the clevis 32 and the support arm 34 by a chain and pin assembly 54 having a pin passing through both the support arm 29 and the clevis 32. Similarly, either the clevis 32 or the arm may be provided with regularly spaced holes according to the angular position of the arm 29 with reference to the clevis 32.

Figure 5:
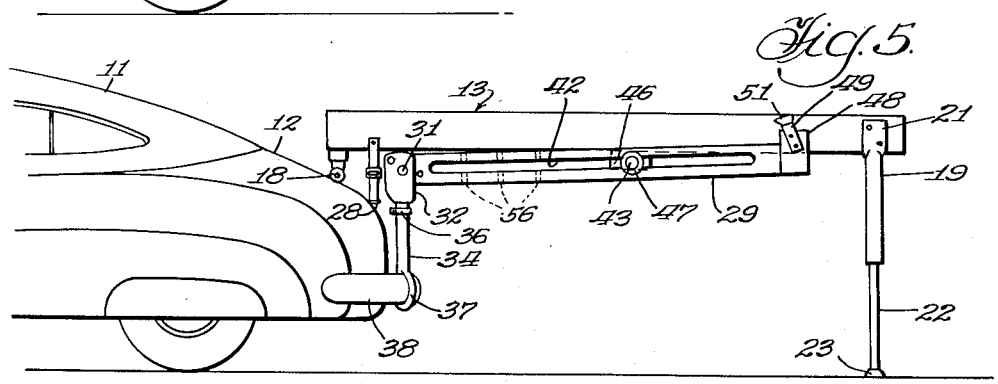
Fig. 5 is a view similar to Fig. 4, but showing the carrier in the unloading position.
Figure 6:
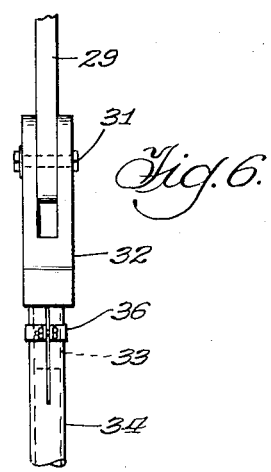
Fig. 6 is an enlarged end view of one of the standards for the swinging support arms, looking in the direction of the arrows 6—6 of Fig. 4.

When it is desired to move the receptacle 13 to the unloading position seen in Fig. 5 the user will grip the supports 19 and break the hold of the vacuum grips 23, after first disconnecting the straps 26 and the hooks 28 and the chain and pin assemblies 52 and 54. After breaking the hold of the vacuum grips 23, the receptacle 13 may be rolled on wheels 18 to the right as seen in Fig. 1; the spacing of the supports 19 relative to the adjacent clevis 32 as shown in Figs. 1 and 2 is such as will permit the said supports to pass the clevis. During the movement of the luggage receptacle 13, the major portion of its weight is supported on the wheels 18 and the rollers 43, the latter of which run in the slotted supporting arms 29. As the receptacle 13 moves further to the right on the top and rear deck surfaces, the arms will continue to support the load until the rear end reaches a lowered position in which greater power can be exerted. When the rollers 43 reach a position to engage a bolt 56ª, the slotted arms 29 are rocked from the position shown in Fig. 1 toward the position shown in dotted lines in Fig. 4. This movement of the arms 29 will continue in a clockwise direction to occupy the positions seen in dotted outline in Fig. 4.

At this time the arms 29 may be employed to partly carry the load of the receptacle 13. The slotted arms 29 are thus preferably provided with spaced oppositely disposed holes 56 to receive a pin 56ª to limit the movement of the roller 43 and the pin 44 in the slot 42 as desired.

As the movement of the receptacle 13 is continued to the right to the position as shown in Fig. 5 the arms 29 will continue to rock in a clockwise direction until the receptacle 13 may be supported on the ground on the supports 19 which are enabled to be lengthened by the spring 24 therein. During the latter movement the user is required to support only one end of the receptacle, since the other end is supported on the deck 12 of the automobile.

When it is desired to return the receptacle 13 to its position atop the vehicle 10, the reverse set of operations takes place until the parts occupy the position as seen in Fig. 1 and the parts locked in position by the straps 26 and the chain and pin assemblies 52 and 54.

While the invention has been described in terms of a preferred embodiment thereof, its scope is not intended to be limited by the disclosure above nor otherwise than by the scope and spirit of the claims appended.

I claim:

1. In a luggage carrier adapted to be supported on the roof of a vehicle, a luggage carrying receptacle having supporting elements one end thereof adapted to movably support the said receptacle on the top and rear deck surfaces of said vehicle, a support for the other end of said receptacle having a vacuum gripping device at the lower end thereof for engagement with the rear deck surface of said vehicle, a pair of spaced receptacle supporting arms extending on each side of said receptacle and pivotally connected to the rear of said vehicle, said spaced arms providing an inclined trackway, and roller means carried by the said receptacle and movably supported on said spaced arms.

2. In a luggage carrier adapted to be supported on the roof of a vehicle, a luggage carrying receptacle having wheels mounted adjacent one end thereof adapted to move on said wheels along the top and rear deck surfaces of said vehicle, a support for the other end of said receptacle having a vacuum gripping device at the lower end thereof for engagement with the rear deck surface of said vehicle, a pair of spaced receptacle supporting arms inclining upwardly at each side of said receptacle and pivotally connected to the rear of said vehicle to permit rocking movement of said arms into and out of their receptacle supporting positions, and a stop on each of said arms for limiting the amount of movement of said receptacle along said spaced arms and providing a support for said receptacle during said rocking movement of said arms toward their non-supporting positions.

3. In a luggage carrier adapted to be supported on the roof of a vehicle, a luggage carrying receptacle having wheels mounted adjacent one end thereof adapted to move on said wheels along the top and rear deck surfaces of said vehicle, a support for the other end of said receptacle having a vacuum gripping device at the lower end thereof for engagement with the rear deck surface of said vehicle, a pair of spaced receptacle supporting arms inclining upwardly at each side of said receptacle and pivotally connected to the rear of said vehicle to permit rocking movement of said arms into and out of their receptacle supporting positions, rollers carried on the said receptacle intermediate its ends and movably engaging said inclined arms to support said receptacle thereon, and a stop on each of said arms for limiting the amount of movement of said receptacle along said spaced arms and providing a support for said receptacle during movement of said spaced arms from their normal load supporting positions toward their non-load supporting positions.

4. In a luggage carrier adapted to be supported on the roof and rear deck portions of a vehicle and movable from its position atop the vehicle to a position to provide a table engaging the ground, a luggage carrying receptacle having wheels mounted adjacent one end thereof adapted to move along the top and rear deck surfaces of said vehicle, a support for the other end of said receptacle for engagement with the rear deck surface of said vehicle, a pair of spaced receptacle supporting arms extending on each side of said receptacle and pivotally connected to the rear of the said vehicle to permit rocking movement of said arms into and out of their receptacle supporting positions, roller means extending from said receptacle and engaging said spaced arms to afford a support connection of said receptacle with said spaced arms during movement of the receptacle to and from its position on the roof of said vehicle, and means adjustably fixed to a rear portion of the vehicle and providing said pivotal connection of said arms to the vehicle.

5. In a luggage carrier adapted to be supported on the roof of an automotive vehicle and to be moved out of its position on said roof to provide a table of normal height, a luggage carrying means having movable support means mounted adjacent one end thereof adapted to movably support one end of said luggage carrying means on the top and rear deck surfaces of said vehicle, a support for the other end of said luggage carrying means for engagement with the rear position of said vehicle, a pair of spaced supporting arms inclining upwardly and forwardly on each side of said luggage carrying means and pivotally connected at their lower ends to the rear of said vehicle, means mounted on the said luggage carrying means and movably engaging said arms to support the luggage carrying means thereon during the movement of the latter toward its table position, and means for locking said luggage carrying means in its position atop of the vehicle.

ANTONIO DI FONZO.

REFERENCES CITED

The following references are of record in the file of this patent:

UNITED STATES PATENTS

| Number | Name | Date |
|---|---|---|
| 2,361,592 | Bjork | Oct. 31, 1944 |
| 2,412,162 | Lindblom | Dec. 3, 1944 |
| 2,479,035 | Burkey | Aug. 16, 1949 |
| 2,492,841 | Burkey | Dec. 27, 1949 |
| 2,521,815 | Will | Sept. 12, 1950 |